United States Patent
Seo

(10) Patent No.: US 7,379,093 B2
(45) Date of Patent: May 27, 2008

(54) STAGE APPARATUS AND CAMERA SHAKE CORRECTION APPARATUS USING THE STAGE APPARATUS

(75) Inventor: Shuzo Seo, Saitama (JP)

(73) Assignee: HOYA Corporation, Tokyo (JP)

( * ) Notice: Subject to any disclaimer, the term of this patent is extended or adjusted under 35 U.S.C. 154(b) by 421 days.

(21) Appl. No.: 11/240,454

(22) Filed: Oct. 3, 2005

(65) Prior Publication Data

US 2006/0070302 A1    Apr. 6, 2006

(30) Foreign Application Priority Data

Oct. 4, 2004    (JP)    ............................. 2004-290951

(51) Int. Cl.
*H04N 5/228* (2006.01)
*G03B 7/00* (2006.01)

(52) U.S. Cl. ..................................... 348/208.4; 396/55
(58) Field of Classification Search ............ 348/208.4, 348/208.7, 208.11; 396/55, 56
See application file for complete search history.

(56) References Cited

U.S. PATENT DOCUMENTS

| 4,171,657 | A | * | 10/1979 | Halberschmidt et al. ...... 83/886 |
| 4,320,943 | A | * | 3/1982 | Link ........................ 353/27 R |
| 4,995,277 | A | * | 2/1991 | Yanagisawa ............. 74/490.09 |
| 5,748,391 | A | * | 5/1998 | Tanaka et al. .............. 359/813 |
| 5,748,995 | A | * | 5/1998 | Kitagawa et al. ............. 396/55 |
| 6,005,723 | A | * | 12/1999 | Kosaka et al. .............. 359/822 |
| 6,909,560 | B2 | * | 6/2005 | Lin et al. .................... 359/813 |
| 7,224,893 | B2 | * | 5/2007 | Uenaka ...................... 396/55 |
| 2005/0157287 | A1 | | 7/2005 | Seo |
| 2005/0185057 | A1 | | 8/2005 | Seo |
| 2005/0204640 | A1 | | 9/2005 | Seo |

FOREIGN PATENT DOCUMENTS

JP    2003-057707    2/2003

* cited by examiner

*Primary Examiner*—David Ometz
*Assistant Examiner*—Tuan Le
(74) *Attorney, Agent, or Firm*—Greenblum & Bernstein, P.L.C.

(57) ABSTRACT

A stage apparatus includes an X-direction movable member provided parallel to a reference plane and relatively movable thereto only in a specific X-direction via an X-direction guide device; a Y-direction movable member supported by the X-direction movable member thereon to be movable only in a Y-direction orthogonal to the X-direction of the reference plane via a Y-direction guide device, wherein the X-direction movable member is provided in between a stationary support plate, which is parallel with the reference plane, and the Y-direction movable member; three ball retaining through-holes formed in the X-direction movable member at three vertices of an imaginary triangle; and three balls installed in respective the three ball retaining through-holes so as to contact the stationary support plate and the Y-direction movable member, wherein the three ball retaining through-holes allow each of the three balls to rotate in any rotational direction therein.

20 Claims, 12 Drawing Sheets

STAGE APPARATUS AND CAMERA SHAKE CORRECTION APPARATUS USING THE STAGE APPARATUS

BACKGROUND OF THE INVENTION

1. Field of the Invention

The present invention relates to a stage apparatus which moves a movable stage in two orthogonal directions in a plane, and a camera shake correction apparatus using the stage apparatus.

2. Description of the Prior Art

Conventional stage apparatuses in which a movable stage is moved in two orthogonal directions in a plane are generally provided with a stationary support plate, and an X-direction movable plate and a Y-direction movable plate both of which are parallel to the stationary support plate. The X-direction movable plate is movable relative to the stationary support plate in a plane parallel thereto only in a specific X-direction, and the Y-direction movable plate is movable relative to the X-direction movable plate in a plane parallel to the stationary support plate only in a Y-direction orthogonal to the X-direction.

Applying a linear moving force in the X-direction to the X-direction movable plate by an actuator causes the X-direction movable plate and the Y-direction movable plate to move linearly in the X-direction relative to the stationary support plate. Additionally, applying a linear moving force in the Y-direction to the Y-direction movable plate by another actuator causes the Y-direction movable plate to move linearly in the Y-direction relative to the X-direction movable plate.

However, if the stage apparatus having the above described structure is not provided with any device for keeping the stationary support plate, the X-direction movable plate and the Y-direction movable plate parallel to one another, the X-direction movable plate and the Y-direction movable plate rattle relative to the stationary support plate, and each of the X-direction movable plate and the Y-direction movable plate may move while making contact with nearby elements adjacent thereto to produce friction, which may interfere with the smooth movement of each of the X-direction movable plate and the Y-direction movable plate in the X-direction and the Y-direction, respectively.

SUMMARY OF THE INVENTION

The present invention provides a stage apparatus which operates smoothly at all times so that neither the X-direction movable plate nor the Y-direction movable plate rattles relative to the stationary support plate, and also provides a camera sake correction apparatus using such a stage apparatus.

According to an aspect of the present invention, a stage apparatus is provided, including an X-direction movable member provided parallel to a reference plane and relatively movable to the reference plane only in a specific X-direction via an X-direction guide device; a Y-direction movable member supported by the X-direction movable member thereon to be movable only in a Y-direction orthogonal to the X-direction of the reference plane via a Y-direction guide device, wherein the X-direction movable member is provided in between a stationary support plate, which is parallel with the reference plane, and the Y-direction movable member; three ball retaining through-holes formed in the X-direction movable member at three vertices of an imaginary triangle; and three balls installed in respective the three ball retaining through-holes so as to contact the stationary support plate and the Y-direction movable member, wherein the three ball retaining through-holes allow each of the three balls to rotate in any rotational direction therein.

It is desirable for a center of gravity of the X-direction movable member to be positioned inside a triangular area formed by the imaginary triangle of the three ball retaining through-holes.

It is desirable for the center of gravity to be coincident with a center of the imaginary triangle of the three ball retaining through-holes.

It is desirable for the X-direction guide device to include at least one X-direction guide slot elongated in the X-direction and formed on one of the stationary support plate and the X-direction movable member; and at least one X-direction engaging projection formed on the other of the stationary support plate and the X-direction movable member to be engaged in the X-direction guide slot to be movable only in the X-direction. The Y-direction guide device includes at least one Y-direction guide slot elongated in the Y-direction and formed on one of the X-direction movable member and the Y-direction movable member, and at least one Y-direction engaging projection formed on the other of the X-direction movable member and the Y-direction movable member to be engaged in the Y-direction guide slot to be movable only in the Y-direction.

It is desirable for the stage apparatus to include at least one retaining device which is in contact with the Y-direction movable member on a side thereof opposite from the X-direction movable member to be slidable on the side of the Y-direction movable member in the X-direction and the Y-direction to keep the three balls in contact with the stationary support plate and the Y-direction movable member.

It is desirable for the retaining device to bias the Y-direction movable member toward the X-direction movable member.

It is desirable for the X-direction guide device to include a plurality of X-direction guide slots elongated in the X-direction and formed on one of the stationary support plate and the X-direction movable member; and a plurality of X-direction engaging projections formed on the other of the stationary support plate and the X-direction movable member to be engaged in the plurality of X-direction guide slots, respectively, to be movable only in the X-direction. The plurality of X-direction guide slots and the plurality of X-direction engaging projections are positioned in a straight line parallel to the X-direction.

It is desirable for the Y-direction guide device to include a plurality of Y-direction guide slots elongated in the Y-direction and formed on one of the X-direction movable member and the Y-direction movable member; and a plurality of Y-direction engaging projections formed on the other of the X-direction movable member and the Y-direction movable member to be engaged in the Y-direction guide slot, respectively, to be movable only in the Y-direction. The plurality of Y-direction guide slots are positioned in a straight line parallel to the Y-direction.

It is desirable for the stage apparatus to include an X-direction actuator which moves the Y-direction movable member in the X-direction relative to the stationary support member; and an Y-direction actuator which moves the Y-direction movable member in the Y-direction.

It is desirable for the stage apparatus to include an X-direction actuator which moves the X-direction movable member in the X-direction relative to the stationary support member; and an Y-direction actuator which moves the Y-direction movable member in the Y-direction relative to the X-direction movable member.

The stage apparatus can be incorporated in a camera, wherein the camera includes an image pick-up device which is located on an image plane of a photographing optical system of the camera; a camera shake detection sensor which detects camera shake of the camera; and a controller for driving the X-direction actuator and the Y-direction actuator in accordance with the camera shake detected by the camera shake detection sensor to stabilize an object image which is formed on the image pick-up device through the photographing optical system.

The stage apparatus can be incorporated in a camera, wherein the camera includes a correction lens fixed to the movable stage in front of an image plane of a photographing optical system of the camera and provided on an optical axis of the photographing optical system; a camera shake detection sensor which detects camera shake of the camera; and a controller for driving the X-direction actuator and the Y-direction actuator in accordance with the camera shake detected by the camera shake detection sensor to stabilize an object image which is formed on the image pick-up device through the photographing optical system and the correction lens.

It is desirable for the stationary support plate to lie in a plane orthogonal to an optical axis of the photographing optical system.

It is desirable for the imaginary triangle to be an isosceles triangle.

It is desirable for the three balls to be made of metal.

It is desirable for the retaining device to include a plurality of spring members for biasing the Y-direction movable member toward the X-direction movable member.

It is desirable for the three ball retaining through-holes to be positioned around a rectangular aperture formed in the X-direction movable member.

It is desirable for one of the three ball retaining through-holes to be positioned on an opposite side of the rectangular aperture with respect to remaining two of the three ball retaining through-holes.

It is desirable for the X-direction movable member to include three ball holders made of resilient synthetic resin which are fitted into three mounting holes formed in the X-direction movable member to be fixed thereto, the three ball retaining through-holes being formed in the three ball holders, respectively.

According to the present invention, the stage apparatus operates smoothly at all times because neither the X-direction movable plate nor the Y-direction movable plate rattles relative to the stationary support plate.

The present disclosure relates to subject matter contained in Japanese Patent Application No. 2004-290951 (filed on Oct. 4, 2004) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

An embodiment of a camera shake correction apparatus (image stabilizer) 5 according to the present invention will be hereinafter discussed with reference to the accompanying drawings. The camera shake correction apparatus 5 is incorporated in a digital camera 1 as shown in FIG. 1.

Figure 1:
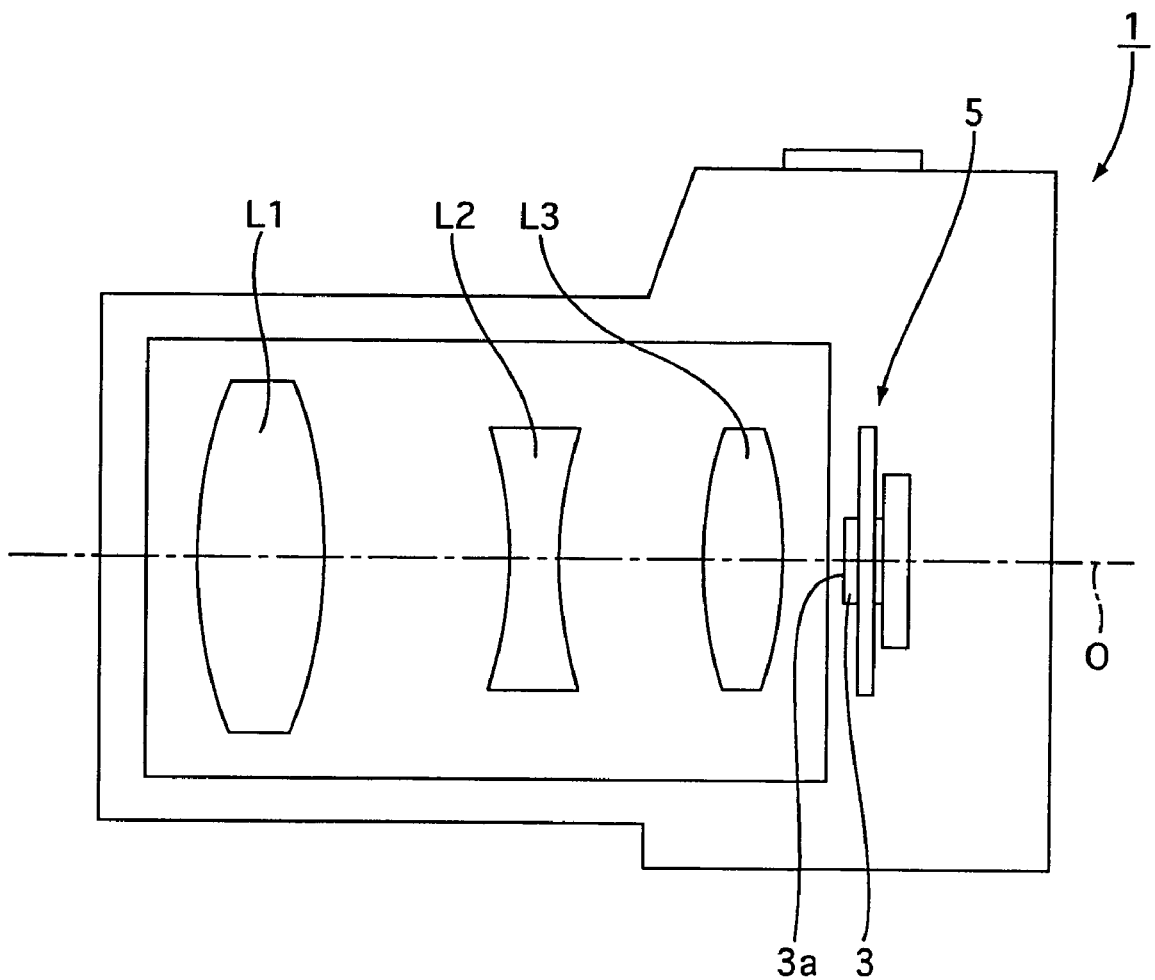
FIG. 1 is a longitudinal sectional view of a digital camera which incorporates an embodiment of a camera shake correction apparatus according to the present invention.

As shown in FIG. 1, the digital camera 1 is provided therein with an optical system (photographing optical system) including a plurality of lenses L1, L2 and L3. A CCD (image pickup device) 3 is provided behind the lens L3. The CCD 3 is provided with an image pickup surface 3a which is located on an image plane of the photographing optical system which is perpendicular to an optical axis O of the photographing optical system. The CCD 3 is secured to the camera shake correction apparatus 5 that is incorporated in the digital camera 1.

The camera shake correction apparatus 5 is constructed as described in the following description with reference to FIGS. 2 through 11.

Figure 2:
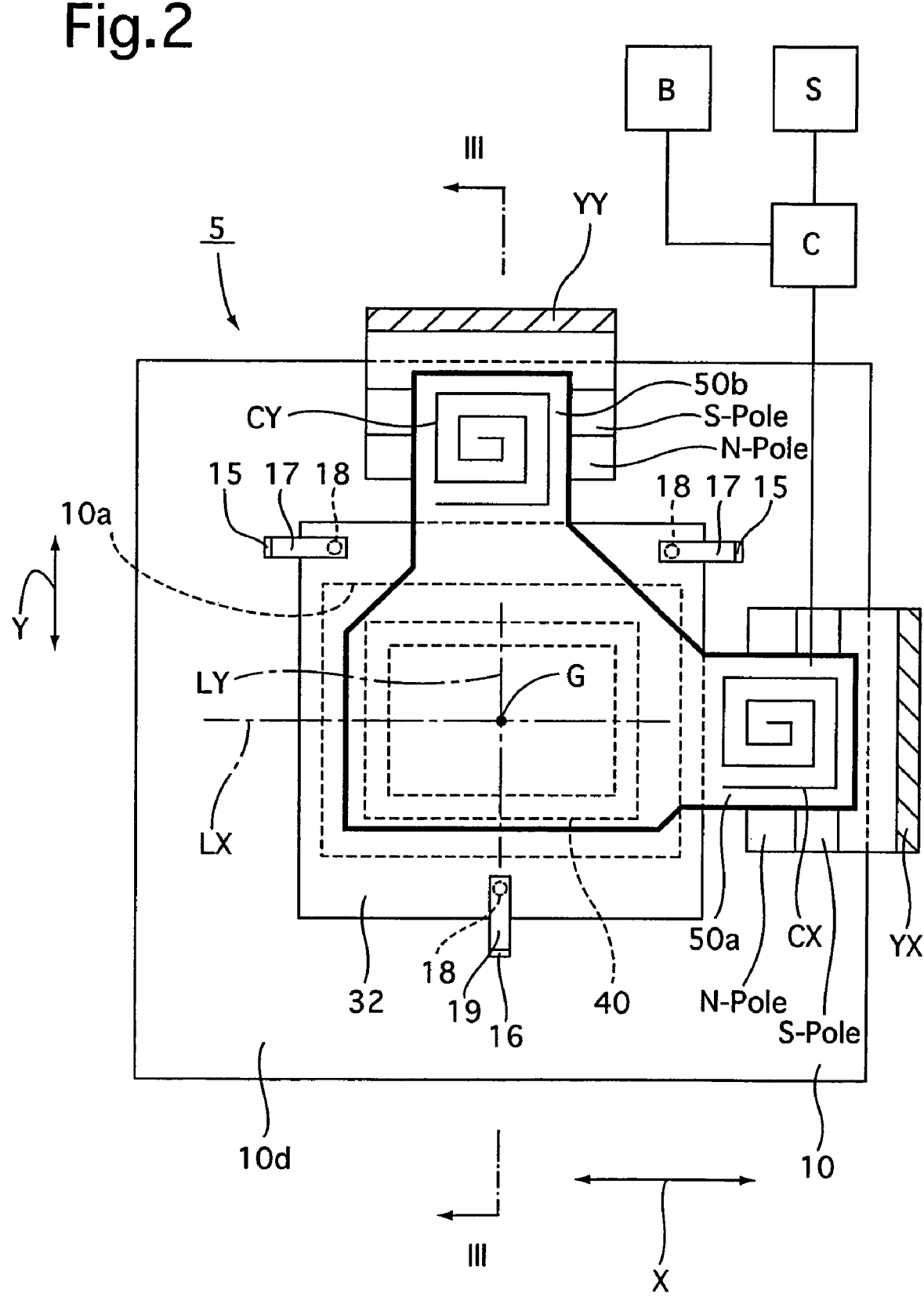
FIG. 2 is a rear elevational view of the camera shake correction apparatus shown in FIG. 1, wherein each of two yoke members of the camera shake correction apparatus is partly shown in cross section.

As shown in FIG. 2, the camera shake correction apparatus 5 is provided with a stationary support plate 10 which is square in shape as viewed from the rear of the camera shake correction apparatus 5. The stationary support plate 10 is provided in a central portion thereof with a square receiving hole 10a. The stationary support plate 10 is secured to the body of the digital camera 1 to be positioned therein by a securing device (not shown) so that the stationary support plate 10 is positioned perpendicular to the optical axis O and the optical axis O passes through the center of the receiving hole 10a. The stationary support plate 10 is provided below the square receiving hole 10a with a pair of X-direction guide slots (elements of an X-direction guide device) 10b and 10c. The pair of X-direction guide slots 10b and 10c are elongated in an X-direction (shown by a double-headed arrow X in each of FIGS. 2 and 6 through 10; horizontal direction as viewed in each of these figures), and are positioned in a straight line parallel to the X-direction. The rear surface of the stationary support plate 10 is formed as a contacting flat surface 10d which is parallel to an X-Y plane (reference plane) parallel to both the X-direction and a Y-direction (shown by a double-headed arrow Y in each of FIGS. 2 and 6 through 10; vertical direction as viewed in each of FIGS. 2 and 7 through 10).

The camera shake correction apparatus 5 is provided immediately behind the stationary support plate 10 with a movable plate (X-direction movable member) 20 which has a rectangular shape as viewed from behind. The movable plate 20 is smaller in size than the stationary support plate 10. The movable plate 20 is provided at the center thereof with a rectangular receiving hole (rectangular aperture) 20a. The length (width) of the rectangular receiving hole 20a in the X-direction is greater than that of the receiving hole 10a, and the length (height) of the rectangular receiving hole 20a in the Y-direction is substantially the same as that of the receiving hole 10a. The movable plate 20 is provided, on a front surface thereof in the vicinity of the lower edge of the movable plate 20, with a pair of X-direction engaging pins (X-direction engaging projections/elements of the X-direction guide device) 20b and 20c which project forward to be parallel to the optical axis O and which are arranged in a straight line parallel to the X-direction. The pair of X-direction engaging pins 20b and 20c are engaged in the pair of X-direction guide slots 10b and 10c, respectively, to be movable only in the X-direction. The movable plate 20 is further provided, on a rear surface thereof on the left side of the receiving hole 20a, with a pair of Y-direction engaging pins (Y-direction engaging projections/elements of the Y-direction guide device) 20d and 20e. The pair of Y-direction engaging pins 20d and 20e project rearward to be parallel to the optical axis O, and lie in a straight line parallel to the Y-direction.

The camera shake correction apparatus 5 is provided with a cover member (a Y-direction movable member) 30. The cover member 30 is provided at a central portion thereof with a bulged portion 31 which projects forward to be positioned in the receiving holes 10a and 20a, and a plate portion 32 which extends vertically and laterally from the rear end of the bulged portion 31. The bulged portion 31 is provided on a front wall thereof with a light receiving opening 31a having a square shape as viewed from the front of the camera shake correction apparatus 5. The lengths of the bulged portion 31 in the X-direction and the Y-direction are smaller than those of each of the receiving holes 10a and 20a, and the lengths of the plate portion 32 in the X-direction and the Y-direction are substantially the same as those of the movable plate 20. The plate portion 32 is provided on a left portion thereof with a pair of Y-direction guide slots (elements of a Y-direction guide device) 30a and 30b. The pair of Y-direction guide slots 30a and 30b are elongated in the Y-direction, and are positioned in a straight line parallel to the Y-direction. The pair of Y-direction engaging pins 20d and 20e of the movable plate 20 are engaged in the pair of Y-direction guide slots 30a and 30b, respectively, to be movable only in the Y-direction. The front surface of the plate portion 32 is formed as a contacting flat surface 32a which is parallel to the aforementioned X-Y plane, which extends parallel to both the X-direction and the Y-direction.

The bulged portion 31 is movable in the receiving holes 10a and 20a both in the X-direction within the range of movement of the pair of X-direction engaging pins 20b and 20c in the pair of X-direction guide slots 10b and 10c, respectively, and in the Y-direction within the range of movement of the pair of Y-direction engaging pins 20d and 20e in the pair of Y-direction guide slots 30a and 30b, respectively (in a range in which the bulged portion 31 does not come in contact with any of the edges of the stationary support plate 10 and the movable plate 20 in the receiving holes 10a and 20a, respectively).

The camera shake correction apparatus 5 is provided on the cover member 30 with a base plate 40 which is fixed to a rear surface of the plate portion 32 of the cover member 30 (see FIG. 3) so that the image pickup surface 3a of the CCD 3, which is fixed to the front surface of the base plate 40, is entirely exposed through the light receiving hole 31a as viewed from the front of the camera shake correction apparatus 5. Furthermore, a low-pass filter 41 made of a transparent material is provided in the internal space of the bulged portion 31 so that the peripheral surface portion of the low-pass filter 41 abuts against a front wall of the bulged portion 31. A retainer member 42 having a rectangular annular shape in a front elevation is sandwiched between the periphery of the image pickup surface 3a of the CCD 3 and the rear surface of low-pass filter 41.

The movable plate 20 is provided around the receiving hole 20a with three mounting holes 25 which are formed as three cylindrical through-holes, the axes of which are parallel to the optical axis O. The three mounting holes 25 are respectively positioned at the three vertices of an imaginary triangle (isosceles triangle) which are not aligned in a single straight line as viewed in the direction of the optical axis O. Three ball support members (three ball holders) 26 made of a resilient material such as synthetic resin are respectively fitted into the three mounting holes 25 to be fixed thereto by a fixing device such as an adhesive.

Figure 11:
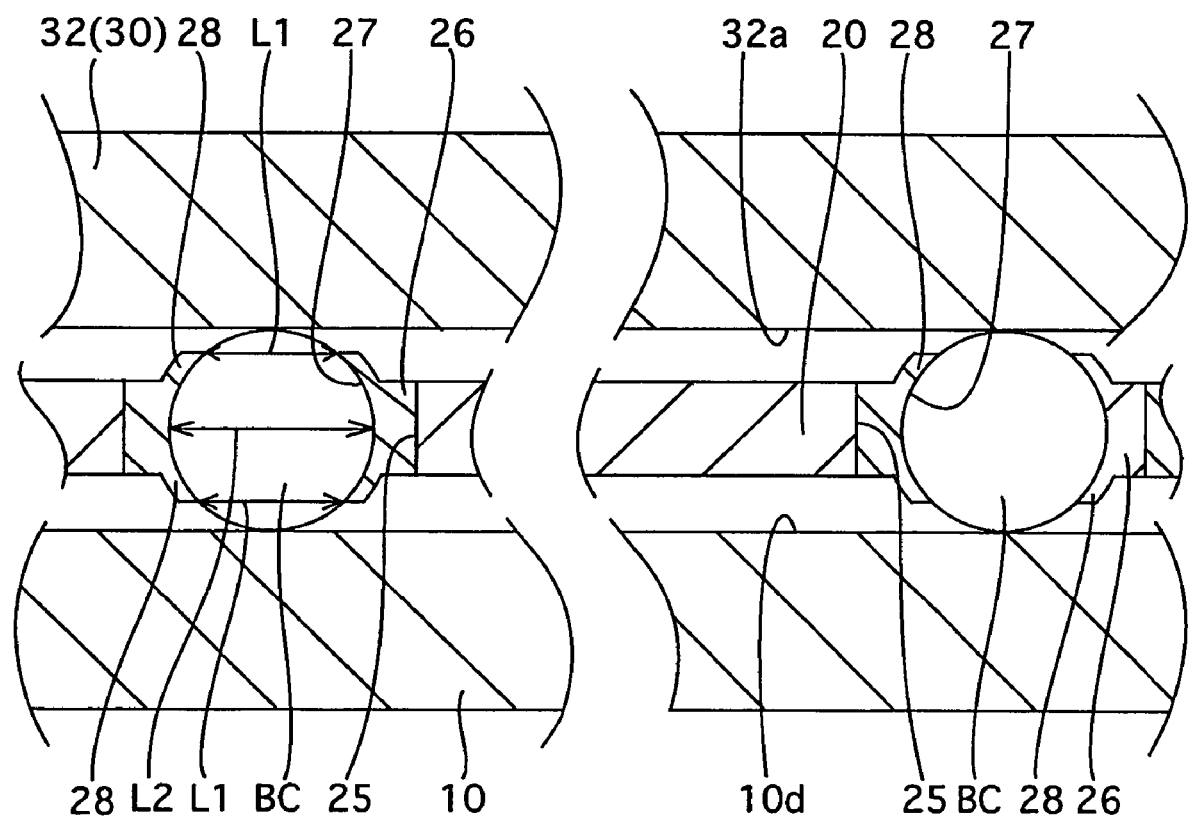
FIG. 11 is a cross sectional view taken along XI-XI line shown in FIG. 10.

As shown in FIG. 11, each ball support member 26 is provided with a ball retaining hole (through-hole) 27 which extends in a direction parallel to the optical axis O through the ball support member 26 (the three ball retaining holes 27 are not aligned in a single straight line as viewed along the direction of the optical axis O). Each ball retaining hole 27 is shaped like a ball having front and rear end portions thereof cut out. Each ball support member 26 is provided around each of the opposite openings of the associated ball retaining hole 27 with an annular ball retaining portion 28. Front and rear end portions (upper and lower end portions as viewed in FIG. 11) of each ball support member 26 form the front annular ball retaining portion 28 and the rear annular ball retaining portion 28, inner peripheral surfaces of which form front and rear ends of the associated ball retaining hole 27, respectively. Each of the front and rear ends of each annular ball retaining hole 27 is circular as viewed from the front of the camera shake correction apparatus 5. As shown in FIG. 11, the diameter L1 of each of the front and rear ends of each annular ball retaining hole 27 is smaller than the maximum diameter L2 of the annular ball retaining hole 27.

A metal ball BC having substantially the same curvature as each annular ball retaining hole 27 is engaged in each annular ball retaining hole 27 to be allowed to rotate therein in any rotational direction. Front and rear portions of each ball BC project forward and rearward from the front and rear ends of the front and rear annular ball retaining portions 28 to be in contact with the contacting flat surface 10*d* of the stationary support plate 10 and the contacting flat surface 32*a* of the plate portion 32, respectively. Three balls BC can be removably fitted into the three annular ball retaining holes 27, respectively, by resiliently deforming each annular ball retaining portion 28. Since the diameter L1 of each of the front and rear ends of each annular ball retaining hole 27 is smaller than the diameter L2 of the annular ball retaining hole 27 (the diameter of each ball BC), each ball BC engaged in the associated annular ball retaining hole 27 does not come off accidentally. The central point among the three balls BC is coincident with the center of gravity G20 (see FIG. 7) of the movable plate 20 (which includes the three ball support members 26) as viewed in the direction of the optical axis O.

The camera shake correction apparatus 5 is provided, on the rear surface of the stationary support plate 10 at three points thereon, with three retaining devices, respectively, which have the structures which will be discussed hereinafter. Such retaining devices are not shown in FIG. 6. The camera shake correction apparatus 5 is provided on the rear surface of the stationary support plate 10 with three support projections: two side support projections 15 and a lower support projection 16, all of which project rearward in a direction parallel to the optical axis O (see FIG. 2). The two side support projections 15 and a lower support projection 16 are formed from a non-resilient hard material. The two side support projections 15 are positioned on laterally opposite sides of the receiving hole 10*a*, and two leaf springs (biasing devices) 17 project from the rear ends of the two side support projections 15 in opposite direction approaching each other in the X-direction. Two pressure balls 18 are fixed to front surfaces of tips of the two leaf springs 17, respectively, and are biased forward by the two leaf springs 17, respectively, to be in pressing contact with the rear surface of the plate portion 32 to be slidable thereon. The lower support projection 16 is positioned directly below the receiving hole 10*a*, and a leaf spring (biasing device) 19 projects upward from the rear end of the lower support projection 16 in the Y-direction. A pressure ball 18 is fixed to a front surface of the tip of the leaf spring 19, and is biased forward by the leaf spring 19 to be in pressing contact with the rear surface of the plate portion 32 to be slidable thereon. The two side support projections 15, the lower support projection 16, the two leaf springs 17, the three pressure balls 18 and the leaf spring 19 are elements of the aforementioned three retaining devices. Since the plate portion 32 is biased forward by resilient contact of the three pressure balls 18 with the rear surface of the plate portion 32, the cover member 30 is prevented from moving rearward. In addition, the three balls BC remain in contact with both the contacting flat surface 32*a* of the plate portion 32 and the contacting flat surface 10*d* of the stationary support plate 10 as shown in FIGS. 3 and 11.

Figure 3:
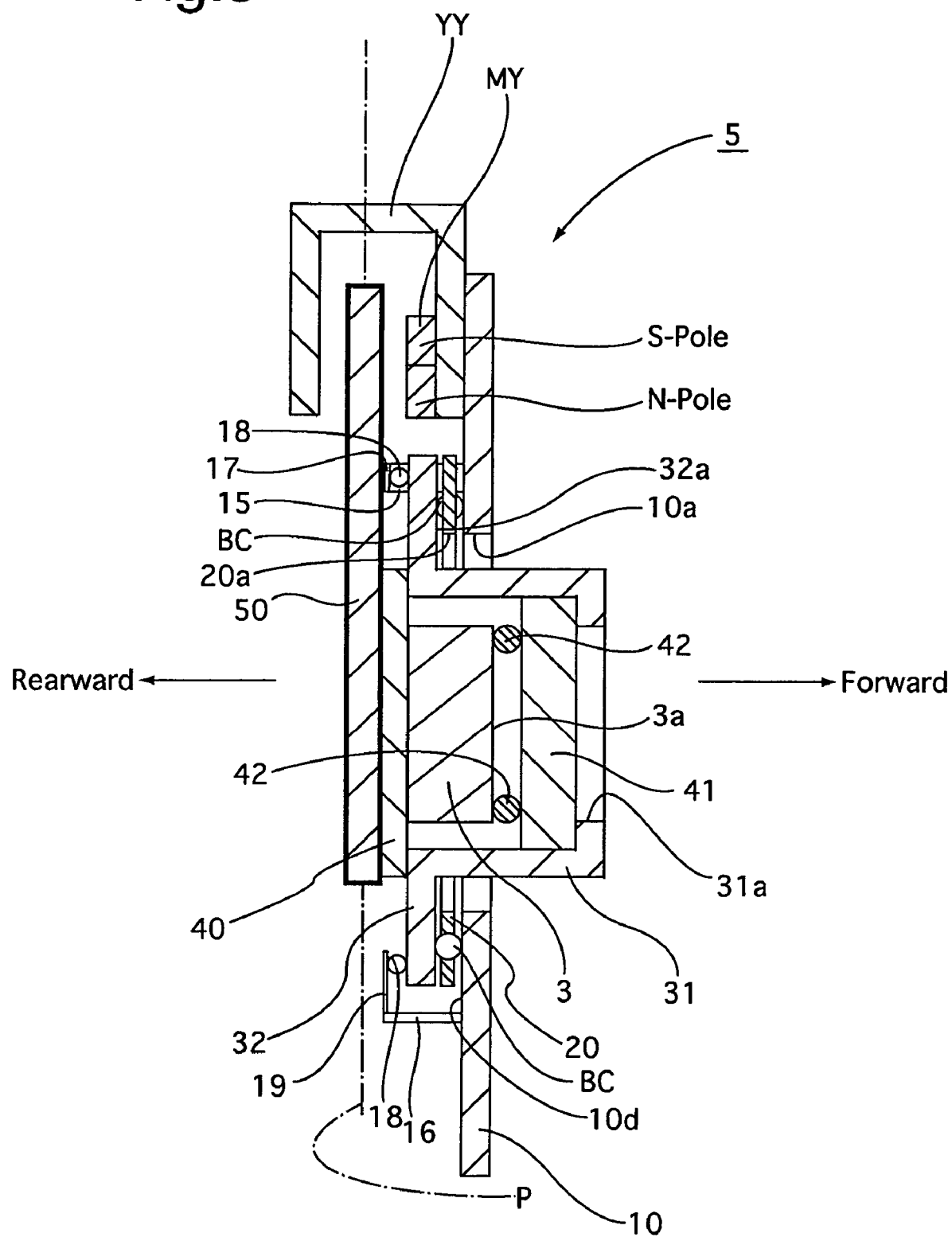
FIG. 3 is a cross sectional view taken along III-III line shown in FIG. 2.

As shown in FIGS. 2 and 3, the camera shake correction apparatus 5 is provided with an electric circuit board 50 (an element of the movable stage) which is secured to the rear surface of the base plate 40. The base plate 40 lies in an imaginary X-Y plane P (see FIG. 3) parallel to both the X-direction and the Y-direction. The movable plate 20, the cover member 30, the base plate 40 and the circuit board 50 constitute a movable stage which is guided in the X and Y directions on the stationary support plate 10. The circuit board 50 is provided with a large number of conductor wires (not shown) to which the CCD 3 is electrically connected. The circuit board 50 is provided with two projecting tongues 50*a* and 50*b* on the rear surfaces of which a planar X-direction drive coil (an element of an X-direction actuator) CX and a planar Y-direction drive coil (an element of a Y-direction actuator) CY are printed, respectively. The X-direction drive coil CX and the Y-direction drive coil CY lie in a plane parallel to the circuit board 50.

Figure 4:
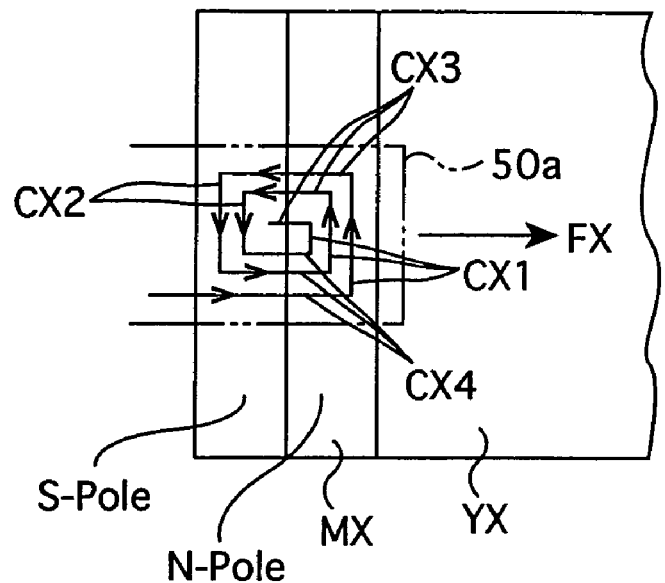
FIG. 4 is an enlarged schematic view of an X-direction driving system.
Figure 5:
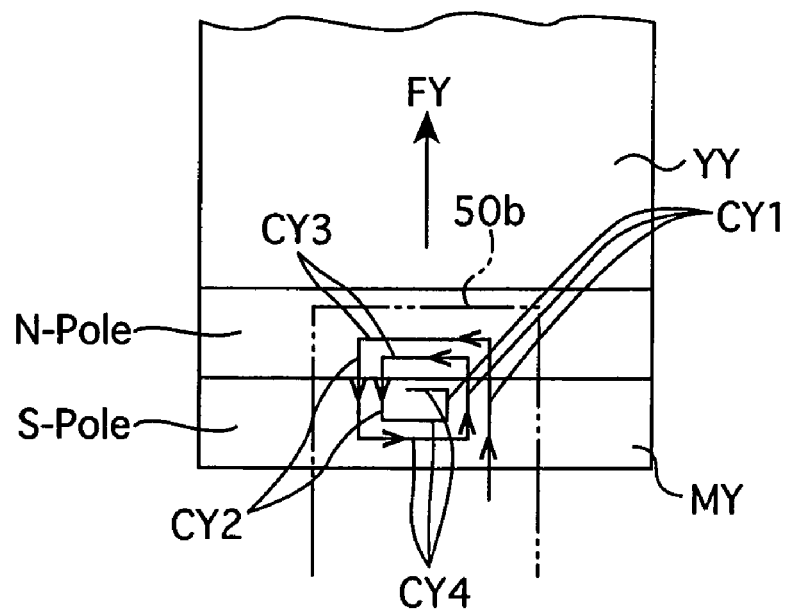
FIG. 5 is an enlarged schematic view of a Y-direction driving system.
Figure 6:
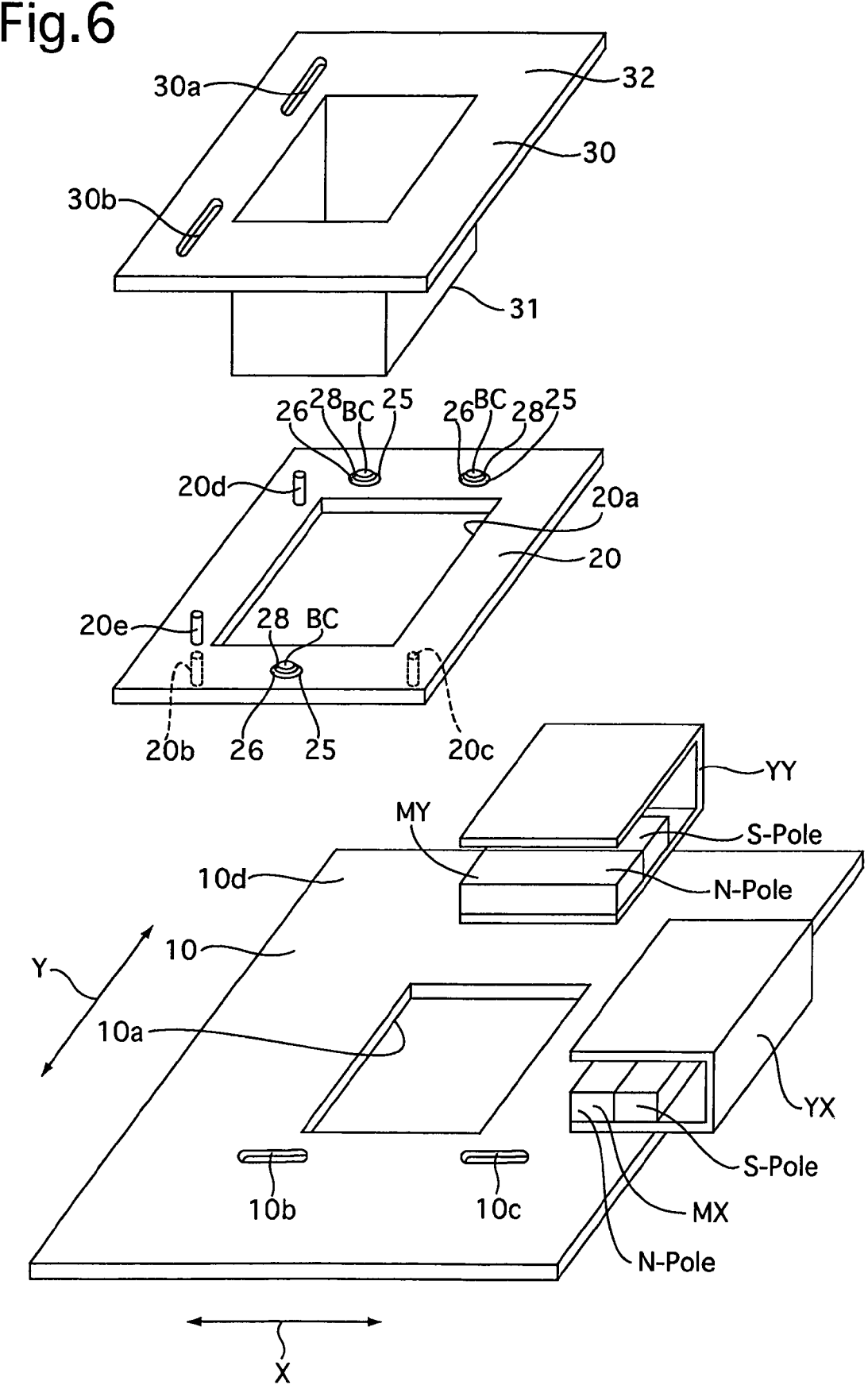
FIG. 6 is an exploded perspective view of a stage apparatus shown in FIG. 2.

As shown in FIG. 4, the X-direction drive coil CX is rectangularly coiled and is defined by linear right sides CX1, linear left sides CX2, linear upper sides CX3 and linear lower sides CX4. As shown in FIG. 5, the Y-direction drive coil CY is rectangularly coiled and is defined by linear right sides CY1, linear left sides CY2, linear upper sides CY3 and linear lower sides CY4. Although the X-direction drive coil CX and the Y-direction drive coil CY have several turns in the drawings, in practice there are several scores of turns.

Each end of the X-direction drive coil CX and each end of the Y-direction drive coil CY are electrically connected to the aforementioned conductor wires of the circuit board 50. Furthermore, as viewed from the rear of the camera shake correction apparatus 5, an imaginary X-direction line LX, which linearly extends in the X-direction and passes through the center of the X-direction drive coil CX, passes through the center of the CCD 3, and also an imaginary Y-direction line LY, which linearly extends in the Y-direction and passes through the center of the Y-direction drive coil CY, passes through the center of the CCD 3. Moreover, the center of gravity G of a movable block movable in the X-direction and the Y-direction, which consists of the movable plate 20, the cover member 30, the base plate 40, the circuit board 50, the X-direction drive coil CX and the Y-direction drive coil CY, is coincident with the center of the CCD 3 in the forward/rearward direction of the camera shake correction apparatus 5 (i.e., in a direction parallel to the optical axis O) in the state shown in FIG. 2 (i.e., in an inoperative state).

The camera shake correction apparatus 5 is provided with two yoke members: an X-direction yoke YX (an element of the X-direction actuator) and a Y-direction yoke YY (an element of the Y-direction actuator) which are secured to the rear surface of the stationary support plate 10 at two points thereon. The two yoke members YX and YY are made of a soft magnetic material such as metal, and are U-shaped in cross section. The two yoke members YX and YY are provided with an X-direction magnet (an element of the X-direction actuator) MX and a Y-direction magnet (an element of the Y-direction actuator) MY which are secured to inner surfaces of the two yoke members YX and YY, respectively. The magnet MX of the yoke member YX includes an N-pole and an S-pole which are aligned in the X-direction, and the magnet MY of the yoke member YY includes an N-pole and an S-pole which are aligned in the Y-direction.

As shown in FIG. 3, the rear end of the yoke member YY is opposed to the magnet MY to form a magnetic circuit, together with the magnet MY.

Likewise, the rear end of the yoke member YX forms a magnetic circuit, together with the magnet MX.

As can be seen in FIGS. 2 and 3, the projecting tongues 50*a* and 50*b* of the circuit board 50 are located in the yoke members YX and YY, respectively.

As shown in FIG. 2, the digital camera 1 is provided with a battery B, a camera shake detection sensor S for detecting camera shake of the digital camera 1, and a control circuit (control device) C which supplies the electric power of the battery B to the drive coils CX and CY while varying the direction and magnitude thereof in accordance with shake information detected by the camera shake detection sensor S. The battery B and the camera shake detection sensor S are electrically connected to the control circuit C which is electrically connected to the aforementioned conductor wires of the circuit board 50.

The above described components of the camera shake correction apparatus 5 except the CCD 3, the shake detection sensor S, the control circuit C and the battery B, constitute a stage apparatus of the camera shape correction apparatus 5.

The camera shake correction apparatus 5 operates as follows.

In a photographing operation carried out by the digital camera 1, light transmitted through the lenses L1 through L3 is converged onto the image pickup surface 3a of the CCD 3 through the light receiving opening 31a and the low-pass filter 41 to form an image on the image pickup surface 3a. If a camera shake correction switch (not shown) of the digital camera 1 is ON during the photographing operation, the shake detection sensor S does not detect any camera shake when no camera shake (image movement) of the digital camera 1 occurs. Consequently, the camera shake correction apparatus 5 is maintained in an inoperative position as shown in FIG. 2. If a camera shake of the digital camera 1 occurs with the camera shake correction switch ON, the shake detection sensor S detects the camera shake, and the shake information is supplied to the control circuit C. As a result, based on the shake information, the control circuit C supplies electric current generated in the battery B to the X-direction drive coil CX and the Y-direction drive coil CY while adjusting the direction and the magnitude of the electric current.

Figure 7:
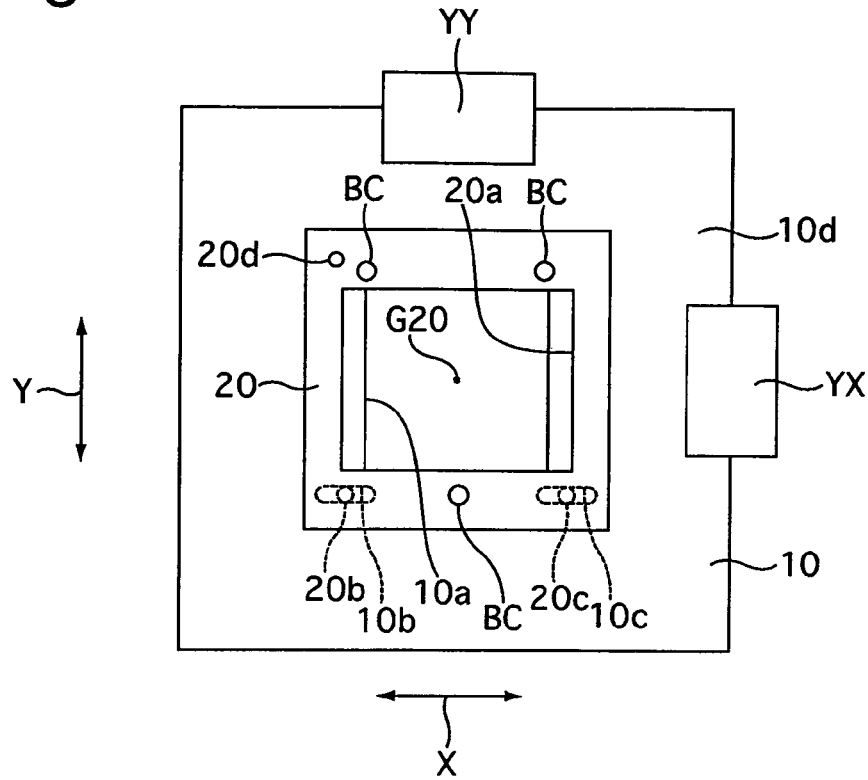
FIG. 7 is a rear elevational view of a portion of the stage apparatus, showing the positional relationship between the stationary support plate and a movable plate in an inoperative state of the stage apparatus.
Figure 8:
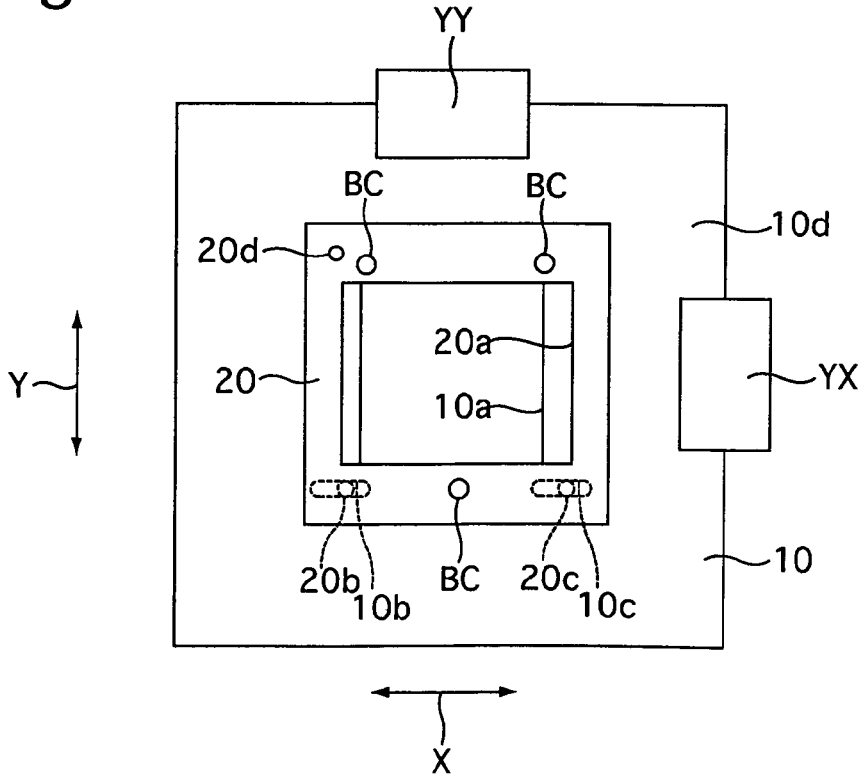
FIG. 8 is a view similar to that of FIG. 7, showing the positional relationship between the stationary support plate and the movable plate in an operative state of the stage apparatus.

FIGS. 7 and 8 are diagrams for illustrating the positional relationship in the X and Y directions between the stationary support plate 10 and the movable plate 20 in an inoperative state and an operative state of the stage apparatus of the camera shake correction apparatus 5, respectively. In these drawings, the Y-direction engaging pin 20e is not shown for the purpose of illustration.

In an inoperative state of the camera shake correction apparatus 5, the linear right sides CX1 of the X-direction drive coil CX are opposed to the N-pole of the magnet MX while the linear left sides CX2 of the X-direction drive coil CX are opposed to the S-pole of the magnet MX in the forward/rearward direction of the camera shake correction apparatus 5 (direction perpendicular to the sheet of paper of FIG. 2) as shown in FIG. 4. In this state, if the electric current is supplied to the X-direction drive coil CX in the direction indicated by the arrows in FIG. 4, a rightward linear force FX in the X-direction is produced in the linear right sides CX1 and the linear left sides CX2 as shown in FIG. 4. This force FX is transferred to the cover member 30 that is integral with the circuit board 50 via the base plate 40, and is further transferred to the movable plate 20 that is prevented from moving relative to the cover member 30 in the X-direction by the engagement of the Y-direction engaging pin 20d and the Y-direction guide slot 30a and the engagement of the Y-direction engaging pin 20e with the Y-direction guide slot 30b. Although the stationary support plate 10 and the movable plate 20 are positioned relative to each other so that the centers of the receiving holes 10a and 20a are coincident with each other in the forward/rearward direction of the camera shake correction apparatus 5 in an inoperative state thereof as shown in FIG. 7, the movable plate 20 to which the force FX is applied moves rightward in the X-direction relative to the stationary support plate 10 so that the pair of X-direction engaging pins 20b and 20c move in the pair of X-direction guide slots 10b and 10c therealong, respectively as shown in FIG. 8. As a result, the circuit board 50 that is integral with the movable plate 20 in the X-direction via the base plate 40 and the cover member 30 moves rightward relative to the stationary support plate 10. Note that forces are produced in the linear upper sides CX3 and the linear lower sides CX4 during such a rightward movement of the circuit board 50; however, these forces cancel each other out and are not applied to the circuit board 50.

The movable plate 20 (and the cover member 30 and the circuit board 50) is movable in the X-direction within a predetermined moving range, in which the linear right sides CX1 of the X-direction drive coil CX remain opposed to the N-pole of the magnet MX while the linear left sides CX2 of the X-direction drive coil CX remain opposed to the S-pole of the magnet MX in the optical axis direction, due to the engagement of the X-direction engaging pin 20b with the X-direction guide slot 10b and the X-direction engaging pin 20c with the X-direction guide slot 10c.

When electric current in a direction opposite to the arrows shown in FIG. 4 is supplied to the X-direction drive coil CX, leftward linear forces in the X-direction are produced in the linear right sides CX1 and the linear left sides CX2, the circuit board 50 moves leftward relative to the stationary support plate 10 due to the engagement of the X-direction engaging pin 20b with the X-direction guide slot 10b and the X-direction engaging pin 20c with the X-direction guide slot 10c. By adjusting the direction of the electric current supplied to the X-direction drive coil CX by the control circuit C in the above described manner, the movable plate 20, together with the circuit board 50, moves leftward or rightward in the X-direction (lateral direction).

Moreover, as soon as the supply of the current from the battery B to the X-direction drive coil CX is stopped, the movement of the circuit board 50 is stopped due to absence of the linear force (FX) in the X-direction.

Since the magnitude of the current supplied to the X-direction drive coil CX is proportional to the magnitude of the linear force in the X-direction which is produced by the current supplied to the X-direction drive coil CX, the linear force that is applied to the X-direction drive coil CX is increased or reduced by increasing or reducing the current supplied to the X-direction drive coil CX from the battery B.

When the movable plate 20 moves linearly in the X-direction relative to the stationary support plate 10 in the above described manner, the movable plate 20 can move smoothly relative to the stationary support plate 10 because each pressure ball 18 biases the plate portion 32 of the cover member 30 toward the stationary support plate 10 while sliding on the rear surface of the plate portion 32, and simultaneously, each ball BC moves in the X-direction relative to stationary support plate 10 and the plate portion 32 while rolling on both the contacting flat surface 10d of the stationary support plate 10 and the contacting flat surface 32a of the plate portion 32 therebetween.

Figure 9:
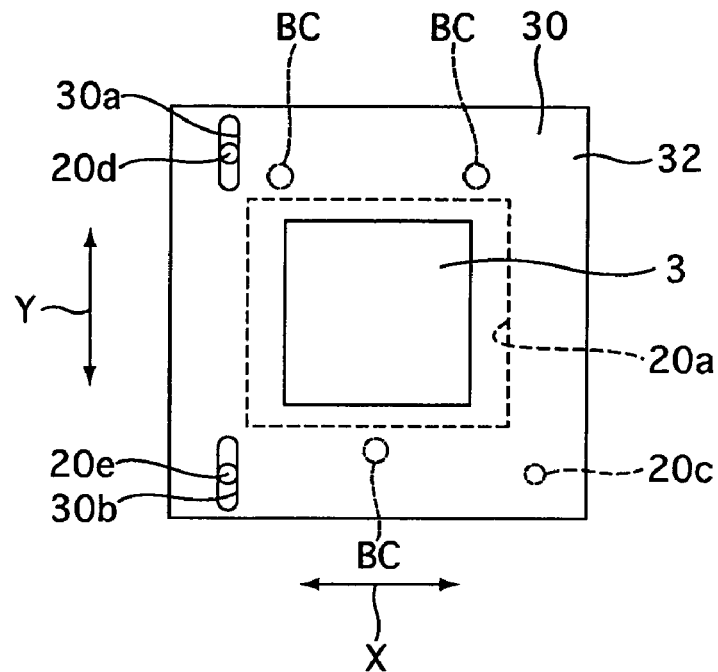
FIG. 9 is a rear elevational view of a portion of the stage apparatus, showing the positional relationship between the movable plate and the cover member in an inoperative state of the stage apparatus.
Figure 10:
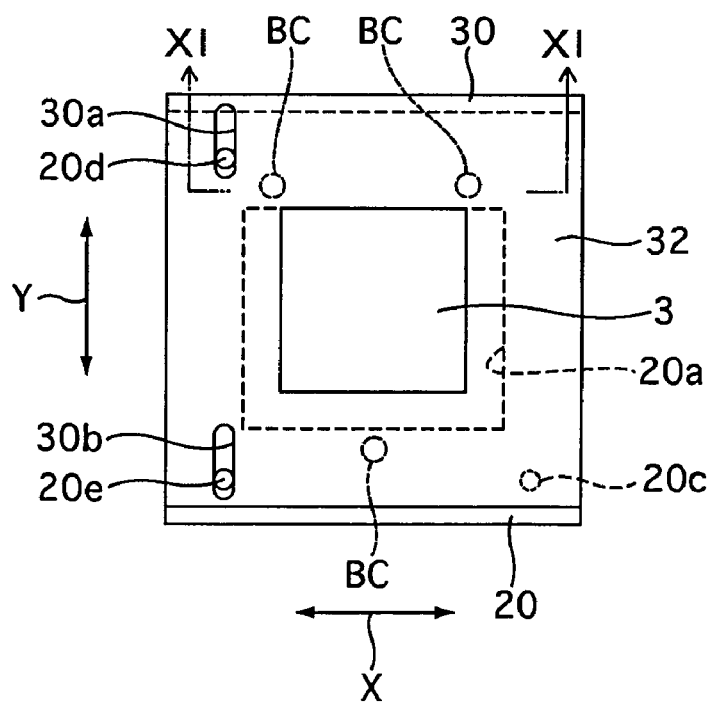
FIG. 10 is a view similar to that of FIG. 9, showing the positional relationship between the movable plate and the cover member in an operative state of the stage apparatus.

FIGS. 9 and 10 are diagrams for illustrating the positional relationship in the X and Y directions between the movable plate 20 and the cover member 30 in an inoperative state and an operative state of the stage apparatus of the camera shake correction apparatus 5, respectively. In these drawings, the X-direction engaging pin 20b is hidden behind the Y-direction engaging pin 20e because the X-direction engaging pin 20b is located at the same position as the Y-direction engaging pin 20e in the X and Y directions.

In an inoperative state of the camera shake correction apparatus 5, the linear upper sides CY3 of the Y-direction drive coil CY are opposed to the N-pole of the magnet MY while the linear lower sides CY4 of the Y-direction drive coil CY are opposed to the S-pole of the magnet MY in the forward/rearward direction of the camera shake correction apparatus 5 as shown in FIG. 5. In this state, if the electric current is supplied to the Y-direction drive coil CY in the direction indicated by the arrows in FIG. 5, an upward linear force FY in the Y-direction is produced in the linear upper sides CY3 and the linear lower sides CY4 as shown in FIG. 5. This force FY is transferred to the cover member 30 that is integral with the circuit board 50 via the base plate 40. Although the movable plate 20 and the cover member 30 are positioned relative to each other as shown in FIG. 9 in an inoperative state of the camera shake correction apparatus 5, the cover member 30 to which the force FY is applied moves upward in the Y-direction relative to the movable plate 20 so that the pair of Y-direction guide slots 30*a* and 30*b* move upward relative to the pair of Y-direction engaging pins 20*d* and 20*e* as shown in FIG. 10. As a result, the circuit board 50 that is integral with the cover member 30 moves upward in the Y-direction relative to the stationary support plate 10. Note that forces are produced in the linear right sides CY1 and the linear left sides CY2 during such an upward movement of the circuit board 50; however, these forces cancel each other out and are not applied to the circuit board 50.

The cover member 30 (and the circuit board 50) is movable in the Y-direction within a predetermined moving range, in which the linear upper sides CY3 of the Y-direction drive coil CY remain opposed to the N-pole of the magnet MY while the linear lower sides CY4 of the Y-direction drive coil CY remain opposed to the S-pole of the magnet MY in the optical axis direction, due to the engagement of the Y-direction engaging pin 20*d* with the Y-direction guide slot 30*a* and the Y-direction engaging pin 20*e* with the Y-direction guide slot 30*b*. When electric current in a direction opposite to the arrows shown in FIG. 5 is supplied to the Y-direction drive coil CY, downward linear forces in the Y-direction are produced in the linear upper sides CY3 and the linear lower sides CY4, the circuit board 50 moves downward relative to the stationary support plate 10 due to the engagement of the Y-direction engaging pin 20*d* with the Y-direction guide slot 30*a* and the Y-direction engaging pin 20*e* with the Y-direction guide slot 30*b*.

By adjusting the direction of the electric current supplied to the Y-direction drive coil CY by the control circuit C in the above described manner, the movable plate 20, together with the circuit board 50, moves vertically in the Y-direction within an movement range in which the bulged portion 31 does not come in contact with any of the edges of the receiving holes 10*a* and 20*a*.

Moreover, as soon as the supply of the current from the battery B to the Y-direction drive coil CY is stopped, the movement of the circuit board 50 is stopped due to absence of the linear force (FY) in the Y-direction.

Since the magnitude of the current to be supplied to the Y-direction drive coil CY is proportional to the magnitude of the force in the Y-direction, which is produced by the current supplied to the Y-direction drive coil CY, the force that is applied to the Y-direction drive coil CY is increased or reduced by increasing or reducing the current supplied to the Y-direction drive coil CY from the battery B.

When the cover member 30 moves linearly in the Y-direction relative to the movable plate 20 in the above described manner, the cover member 30 can move smoothly relative to the movable plate 20 because each pressure ball 18 biases the plate portion 32 of the cover member 30 toward the stationary support plate 10 while sliding on the rear surface of the plate portion 32, and simultaneously, each ball BC moves in the Y-direction relative to stationary support plate 10 and the plate portion 32 while rolling on both the contacting flat surface 10*d* of the stationary support plate 10 and the contacting flat surface 32*a* of the plate portion 32 therebetween.

The circuit board 50 (and the CCD 3) oscillates in the X and Y directions to cancel out the camera shake of the digital camera 1 which is detected by the camera shake detection sensor S to stabilize an object image formed on the image pickup surface 3*a* of the CCD 3 by variations in the position of the CCD 3 in the X and Y directions.

In the stage apparatus of the camera shake correction apparatus 5 that is incorporated in the above described embodiment of the digital camera 1, the movable plate 20 that serves as an X-direction movable member can be installed on the stationary support plate 10 to be movable only in the X-direction by making the pair of X-direction engaging pins 20*b* and 20*c* engaged in the pair of X-direction guide slots 10*b* and 10*c*, respectively. Moreover, the cover member 30 that serves as an Y-direction movable member can be installed on the movable plate 20 to be movable only in the Y-direction by making the pair of Y-direction guide slots 30*a* and 30*b* engaged with the pair of Y-direction engaging pins 20*d* and 20*e*, respectively, and accordingly, the stage apparatus of the camera shake correction apparatus 5 can be assembled easily. Moreover, the stage apparatus of the camera shake correction apparatus 5 is made of a relatively small number of elements and is therefore very simple in structure, and accordingly, the manufacturing cost of the camera shake correction apparatus 5 can be reduced.

Additionally, since the pair of X-direction guide slots 10*b* and 10*c* and the pair of X-direction engaging pins 20*b* and 20*c* are arranged to lie in a straight line parallel to the X-direction, the accuracy of travel of the pair of X-direction engaging pins 20*b* and 20*c* is higher than that in the case where a pair of guide slots which respectively correspond to the pair of X-direction guide slots 10*b* and 10*c* are not arranged to lie in such a straight line.

Figure 12:
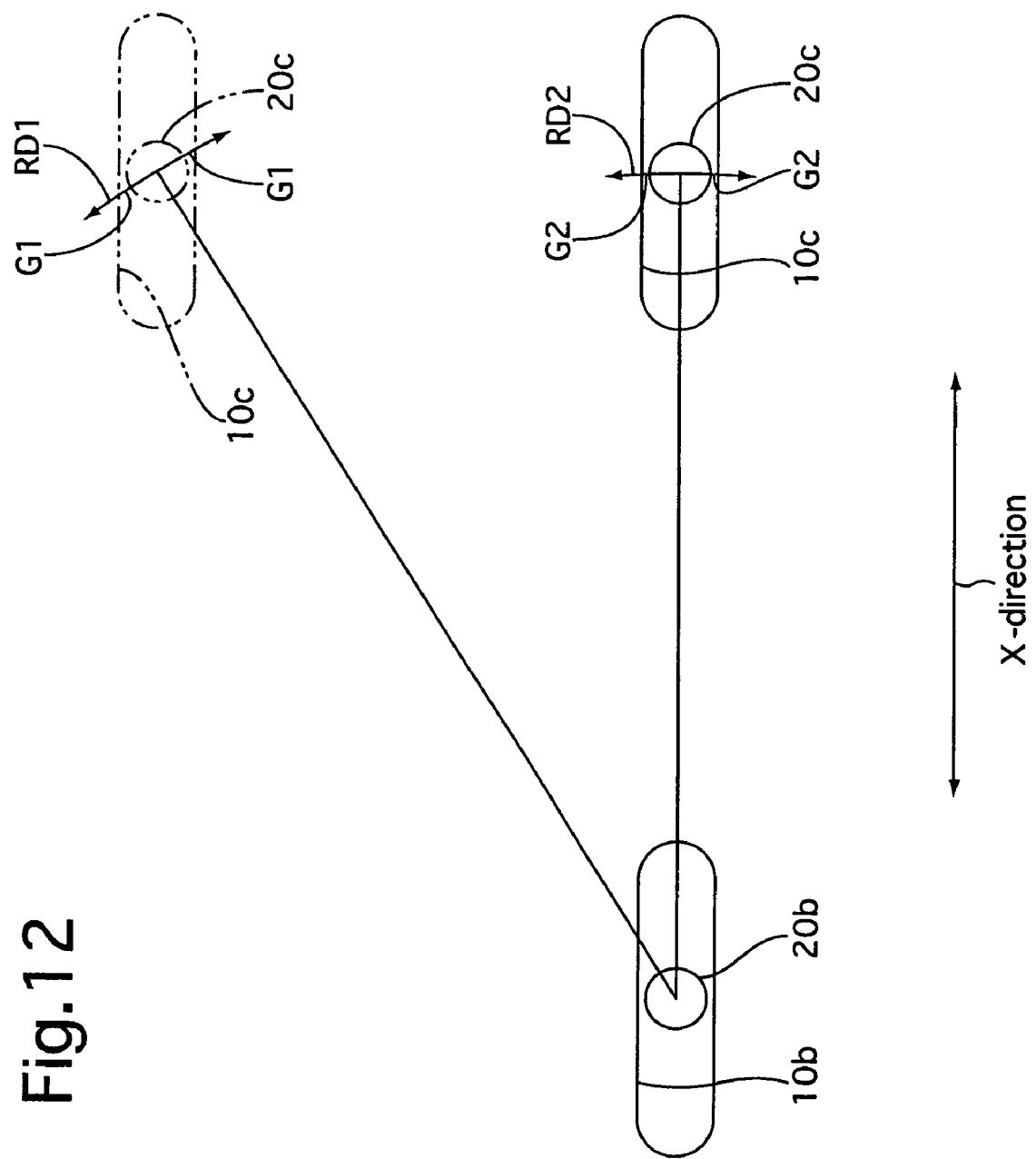
FIG. 12 is a diagram for illustrating the effectiveness of an arrangement of two X-direction engaging pins and two X-direction guide slots all of which are positioned in a straight line parallel to in the X-direction.

Namely, since the X-direction engaging pin 20*c* is rotatable about the X-direction engaging pin 20*b*, clearances G1 between the X-direction engaging pin (comparative X-direction engaging pin) 20*c* and the X-direction guide slot (comparative X-direction engaging pin) 10*c* (both of which are shown by two-dot chain lines in FIG. 12) in the direction of rotation of the X-direction engaging pin 20*c* in the case where the pair of X-direction engaging pins 20*b* and 20*c* and the pair of X-direction guide slots 10*b* and 10*c* do not lie in a straight line parallel to the X-direction become greater than clearances G2 between the X-direction engaging pin 20*c* and the X-direction guide slot 10*c* in the direction of rotation of the X-direction engaging pin 20*c* in the case of the present embodiment in which the pair of X-direction engaging pins 20*b* and 20*c* and the pair of X-direction guide slots 10*b* and 10*c* lie in a straight line parallel to the X-direction as shown in FIG. 12. Therefore, in the case where the pair of X-direction engaging pins 20*b* and 20*c* and the pair of X-direction guide slots 10*b* and 10*c* do not lie in a straight line parallel to the X-direction, it is easier for the X-direction engaging pin 20*c* to rotate in the X-direction guide slot 10*c* about the X-direction engaging pin 20*b*, which deteriorates the accuracy of travel of the pair of X-direction engaging pins 20*b* and 20*c* (i.e., the accuracy of travel of the pair of X-direction engaging pins 20*b* and 20*c* in the case where the pair of X-direction engaging pins 20*b* and 20*c* and the pair of X-direction guide slots 10*b* and 10*c* lie in a straight line is better). A similar problem arises with the X-direction engaging pin 20*b* which is rotatable about the X-direction engaging pin 20*c*.

In addition, since the pair of Y-direction guide slots 30*a* and 30*b* and the pair of Y-direction engaging pins 20*d* and 20*e* lie in a straight line parallel to the Y-direction, the accuracy of travel of the pair of Y-direction engaging pins 20*d* and 20*e* is higher than that in the case where a pair of pins and a pair of guide slots which respectively correspond to the pair of X-direction engaging pins 20*d* and 20*e* and the pair of X-direction guide slots 30*a* and 30*b* do not lie in such a straight line.

The movable plate 20 can move linearly smoothly in the X-direction every time without rattling relative to the stationary support plate 10 because the contacting flat surface 32*a* of the plate portion 32 and the contacting flat surface 10*d* of the stationary support plate 10 remain in contact with the three balls BC due to the action of the pressure balls 18 which are respectively biased by the three leaf springs 17 and 19. Moreover, the cover member 30 can move linearly in the Y-direction every time without rattling relative to the movable plate 20. Furthermore, there is no possibility of either the cover member 30 or the movable plate 20 coming off the stationary support plate 10.

The number of the balls BC can be minimized because each ball BC is in contact with both the contacting flat surface 32*a* of the plate portion 32 and the contacting flat surface 10*d* of the stationary support plate 10. Therefore, a reduction in the number of elements of the camera shake correction apparatus 5, a reduction in the weight of each of the camera shake correction apparatus 5 and the stage apparatus thereof, and a reduction in the driving force required for driving the X-direction actuator (composed of the X-direction drive coil CX, the X-direction yoke YX and the X-direction magnet MX) and the Y-direction actuator (composed of the Y-direction drive coil CY, the Y-direction yoke YY and the Y-direction magnet MY) are achieved in the above described embodiment of the camera shake correction apparatus 5. Moreover, the assembling operation of the camera shake correction apparatus 5 and the stage apparatus thereof can be facilitated because of the reduction in the number of elements of the camera shake correction apparatus 5.

Additionally, as viewed in the direction of the optical axis O, the center of gravity G20 of the movable plate 20 (which includes the three ball support members 26) is positioned inside a triangular area formed by connecting the points of the three balls BC (or the ball retaining holes 27), and accordingly, the movable plate 20, together with the three ball support members 26, is supported by the three balls BC in a well-balanced manner, which contributes to an achievement in smooth movement of the movable plate 20. In particular, since the center of gravity G20 of the movable plate 20 is coincident with the central point among the three balls BC, as viewed in the direction of the optical axis O, the movable plate 20, together with the three ball support members 26, is supported by the three balls BC in a particularly well-balanced manner.

Moreover, the linear force produced in the X-direction drive coil CX and the Y-direction drive coil CY are effectively transmitted to the circuit board 50 because a point of intersection of the imaginary X-direction line LX and the imaginary Y-direction line LY is coincident with the center of gravity G of the movable block that consists of the movable plate 20, the cover member 30, the base plate 40, the circuit board 50, the X-direction drive coil CX and the Y-direction drive coil CY in the forward/rearward direction of the camera shake correction apparatus 5. Although the position of the aforementioned center of gravity G relative to the movable plate 20 deviates in some degree from the position shown in FIG. 3 when the cover member 30 moves relative to the movable plate 20, the force produced in the X-direction drive coil CX and the Y-direction drive coil CY are effectively transmitted to the circuit board 50 in this state also because the center of gravity G is substantially coincident with a point of intersection of the imaginary X-direction line LX and the imaginary Y-direction line LY in the forward/rearward direction of the camera shake correction apparatus 5 upon the movement of the cover member 30 relative to the movable plate 20.

Although the above discussion has been addressed to an embodiment of a stage apparatus applied to the camera shake correction apparatus 5, the application of the stage apparatus according to the present invention is not limited thereto. The invention can be applied to a stage apparatus in various ways. For instance, an X-direction guide device different from the above described X-direction guide device for guiding the movable plate (the X-direction movable member) 20 in the X-direction relative to the stationary support plate 10 can be adopted, while a Y-direction guide device different from the above described Y-direction guide device for guiding the cover member (the Y-direction movable member) 30 in the Y-direction relative to the movable plate (the X-direction movable member) 20 can be adopted.

Figure 13:
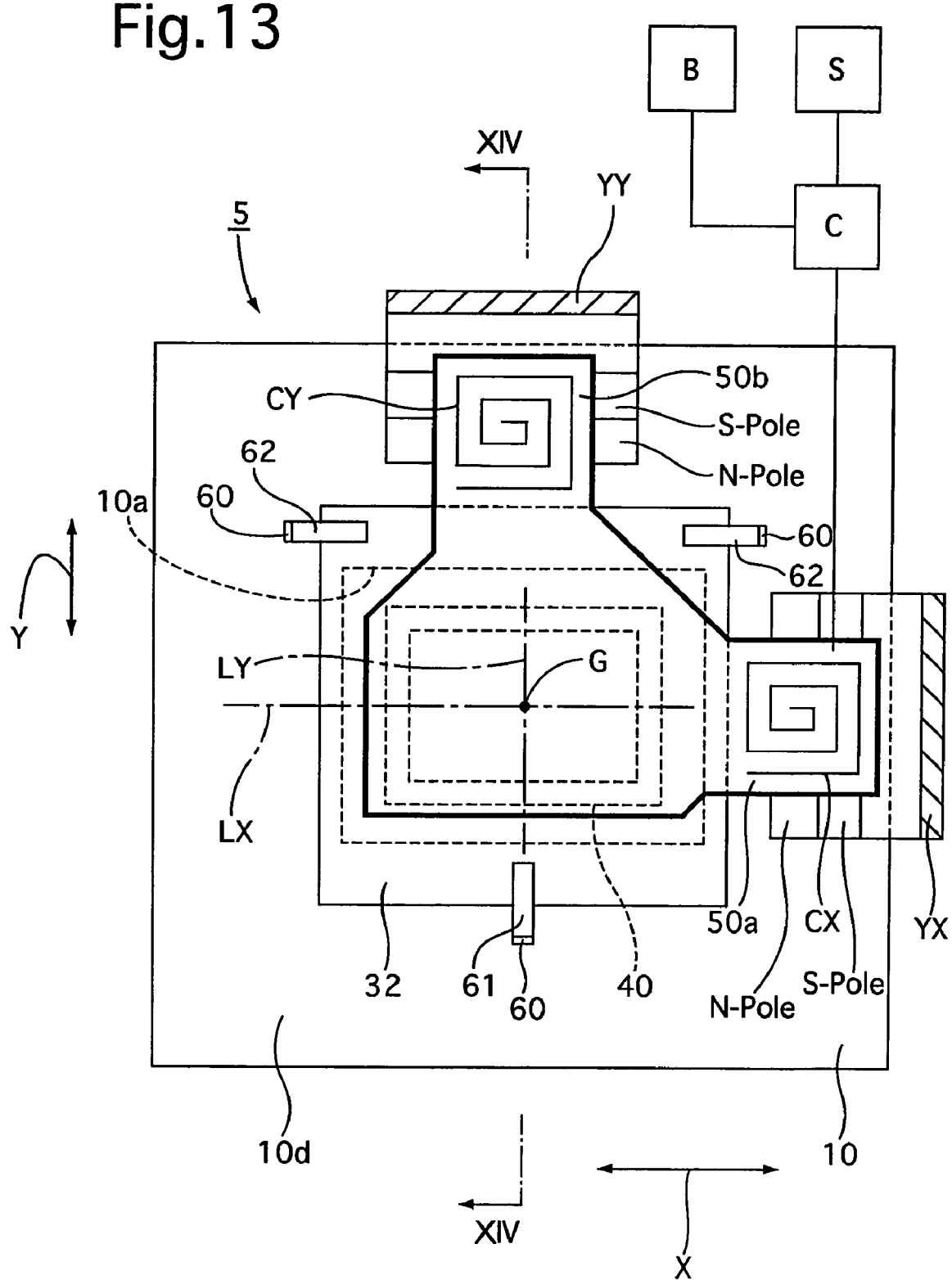
FIG. 13 is a view similar to that of FIG. 2, showing another embodiment of the camera shake correction apparatus which is equipped with a modified retaining device.
Figure 14:
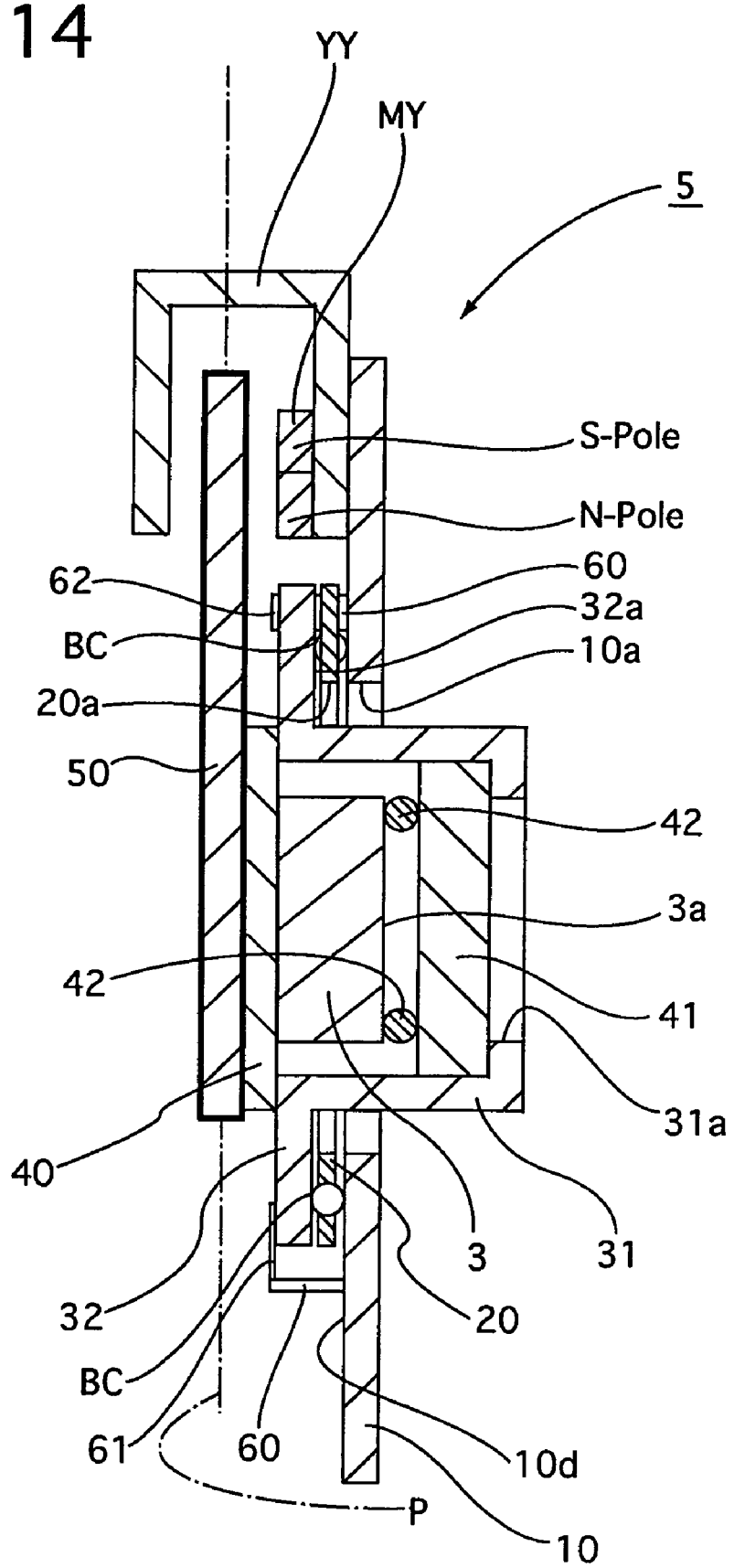
FIG. 14 is a cross sectional view taken along XIV-XIV line shown in FIG. 13.

The above described three retaining devices, which are composed of the two side support projections 15, the lower support projection 16, the two leaf springs 17, the three pressure balls 18 and the leaf spring 19, can be replaced by another three retaining devices shown in FIGS. 13 and 14. These three retaining devices are composed of two side support projections 60 and a lower support projection 60 which are all formed from a non-resilient hard material and project rearward from the rear surface of the stationary support plate 10 at three points thereon, a retaining leaf 61 made of a hard material which projects upward from the rear end of the lower support projection 60 in the Y-direction to be capable of being in sliding contact with the rear surface of the plate portion 32 of the cover member 30, and two retaining leaves 62 made of a hard material which project from the rear ends of the two side support projections 60 in opposite directions toward each other in the X-direction to be capable of being in sliding contact with the rear surface of the plate portion 32 of the cover member 30.

Although such three retaining devices shown in FIGS. 13 and 14 do not bias the cover member 30 toward the stationary support plate 10, due to the retaining leaf 61 and the retaining leaves 62 being in sliding contact with rear surface of the plate portion 32, the contacting flat surface 32*a* of the plate portion 32 and the contacting flat surface 10*d* of the stationary support plate 10 remain in contact with each ball BC while allowing each ball BC to roll on both the contacting flat surface 10*d* and the contacting flat surface 32*a*. Accordingly, the movable plate 20 can move linearly smoothly in the X-direction relative to the stationary support plate 10 at all times while the cover member 30 can move linearly smoothly in the Y-direction relative to the movable member 20 at all times.

Although the number of the balls BC is three in the above described embodiment of the stage apparatus, the number of the balls BC can be more than three unless all the balls BC are arranged to lie in a straight line. In this case also, it is desirable that the center of gravity G20 of the movable plate 20 (which includes the three ball support members 26) be positioned inside an area formed by connecting the points of all the balls BC. It is more desirable that the center of gravity G20 of the movable plate 20 (which includes the three ball support members 26) be coincident with the center of all the balls BC.

Each ball support member 26 can be molded of a material other than a resilient material, e.g., can be molded of metal.

In this case, a metal ball BC is fitted into the annular ball retaining hole 27 of each ball support member 26 outside of the associated mounting hole 25, the ball support member 26 is swaged (deformed) to prevent the ball BC from coming out of the annular ball retaining hole 27 by the application of heat to the ball support member 26 as needed, and thereafter the ball support member 26 is fitted into the associated mounting hole 25 and bonded thereto.

In addition, a pair of X-direction guide slots which respectively correspond to the pair of X-direction guide slots 10b and 10c can be formed on the movable plate 20 while a pair of X-direction engaging pins which respectively correspond to the pair of X-direction engaging pins 20b and 20c can be formed on the stationary support plate 10. Moreover, the pair of X-direction guide slots 10b and 10c can be replaced by a single X-direction guide slot while the pair of X-direction engaging pins 20b and 20c can be replaced by a single X-direction engaging pin which is elongated to be prevented from rotating relative to the single X-direction guide slot while being allowed to move only in the X-direction. For instance, this single X-direction engaging pin can be formed in a substantially rectangular cross section which is elongated in the X-direction but is shorter than the single X-direction guide slot in the X-direction.

Likewise, a pair of Y-direction guide slots which respectively correspond to the pair of Y-direction guide slots 30a and 30b can be formed on the movable plate 20 while a pair of Y-direction engaging pins which respectively correspond to the pair of Y-direction engaging pins 20d and 20e can be formed on the cover member 30. Moreover, the pair of Y-direction guide slots 30a and 30b can be replaced by a single Y-direction guide slot while the pair of Y-direction engaging pins 20e and 20e can be replaced by a single Y-direction engaging pin which is elongated to be prevented from rotating relative to the single Y-direction guide slot while being allowed to move only in the Y-direction. For instance, this single Y-direction engaging pin can be formed in a substantially rectangular cross section which is elongated in the Y-direction but is shorter than the single Y-direction guide slot in the Y-direction.

Figure 15:
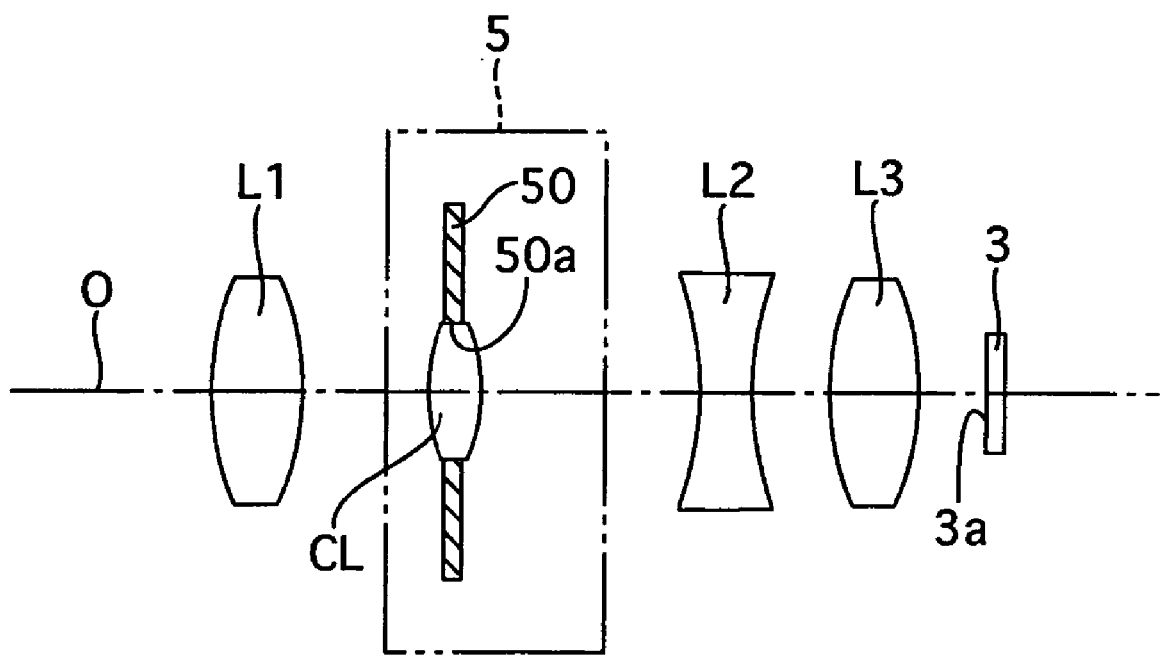
FIG. 15 is an axial cross sectional view of a portion of a modified embodiment of the camera shake correction apparatus according to the present invention, wherein a correction lens is provided.

Although the CCD 3 is secured to the circuit board 50 which is moved in the X and Y directions to compensate the camera shake in the above illustrated embodiment of the camera shake correction apparatus, it is possible to arrange the CCD 3 behind the stationary support plate 10 and to form a circular mounting hole 50a in the circuit board 50 as shown in FIG. 15. A correction lens CL can be fitted and secured to the circular mounting hole 50a and can be arranged between the lenses L1 and L2 (or alternatively between the lenses L2 and L3). In this alternative, the correction lens CL is linearly moved in the X and Y directions to compensate the camera shake. Furthermore, the camera shake correction apparatus 5 using the correction lens CL can be applied to a silver-halide film camera which does not have a CCD.

Additionally, even if the X-direction line LX and the Y-direction line LY are not precisely located on the center of gravity G of the aforementioned movable block (which is composed of the movable plate 20, the cover member 30, the base plate 40, the circuit board 50, the X-direction drive coil CX and the Y-direction drive coil CY) but is located near the center of gravity G in the fore/aft direction of the digital camera 1, the forces generated in the X-direction drive coil CX and the Y-direction drive coil CY can still be effectively transmitted to the circuit board 50.

In addition to the foregoing, it is possible to provide the X-direction drive coil CX and the Y-direction drive coil CY on the stationary support plate 10 and to provide the yoke members YX and YY (and the magnets MX and MY) on the circuit board 50.

Moreover, it is possible to provide three or more X-direction guide slots 10b and 10c on the stationary support plate 10 and to provide correspondingly three or more X-direction engaging pins 20b and 20c on the movable plate 20, so that the X-direction guide slots and the X-direction engaging pins are positioned in a straight line parallel to the X-direction, while it is possible to provide three or more Y-direction guide slots 30a and 30b on the cover member 30 and to provide correspondingly three or more X-direction engaging pins 20d and 20e on the movable plate 20, so that the Y-direction guide slots and the Y-direction engaging pins are positioned in a straight line parallel to the Y-direction.

In addition to the foregoing, the electromagnetic actuator consisting of the X-direction drive coil CX, the Y-direction drive coil CY, the magnets MX and MY and the yoke members YX and YY can be replaced by any other type of actuator, e.g., a motor-driven type of actuator or an actuator using piezoelectric elements for moving the circuit board 50 in the X and Y directions.

Although the above discussion has been addressed to several embodiments of stage apparatuses applied to the camera shake correction apparatus 5, the application of the stage apparatus according to the present invention is not limited thereto. The invention can be applied to various apparatuses in which a movable stage is movable in the X and Y directions (two directions orthogonal to each other).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
   an X-direction movable member provided parallel to a reference plane and relatively movable to said reference plane only in a specific X-direction via an X-direction guide device;
   a Y-direction movable member supported by said X-direction movable member thereon to be movable only in a Y-direction orthogonal to said X-direction of said reference plane via a Y-direction guide device, wherein said X-direction movable member is provided in between a stationary support plate, which is parallel with said reference plane, and said Y-direction movable member;
   three ball retaining through-holes formed in said X-direction movable member at three vertices of an imaginary triangle; and
   three balls installed in respective said three ball retaining through-holes so as to contact said stationary support plate and said Y-direction movable member, wherein said three ball retaining through-holes allow each of said three balls to rotate in any rotational direction therein.

2. The stage apparatus according to claim 1, wherein a center of gravity of said X-direction movable member is positioned inside a triangular area formed by said imaginary triangle of said three ball retaining through-holes.

3. The stage apparatus according to claim 2, wherein said center of gravity is coincident with a center of said imaginary triangle of said three ball retaining through-holes.

4. The stage apparatus according to claim 1, wherein said X-direction guide device comprises:
at least one X-direction guide slot elongated in said X-direction and formed on one of said stationary support plate and said X-direction movable member; and
at least one X-direction engaging projection formed on the other of said stationary support plate and said X-direction movable member to be engaged in said X-direction guide slot to be movable only in said X-direction, and
wherein said Y-direction guide device comprises:
at least one Y-direction guide slot elongated in said Y-direction and formed on one of said X-direction movable member and said Y-direction movable member; and
at least one Y-direction engaging projection formed on the other of said X-direction movable member and said Y-direction movable member to be engaged in said Y-direction guide slot to be movable only in said Y-direction.

5. The stage apparatus according to claim 1, further comprising:
at least one retaining device which is in contact with said Y-direction movable member on a side thereof opposite from said X-direction movable member to be slidable on said side of said Y-direction movable member in said X-direction and said Y-direction to keep said three balls in contact with said stationary support plate and said Y-direction movable member.

6. The stage apparatus according to claim 5, wherein said retaining device biases said Y-direction movable member toward said X-direction movable member.

7. The stage apparatus according to claim 1, wherein said X-direction guide device comprises:
a plurality of X-direction guide slots elongated in said X-direction and formed on one of said stationary support plate and said X-direction movable member; and
a plurality of X-direction engaging projections formed on the other of said stationary support plate and said X-direction movable member to be engaged in said plurality of X-direction guide slots, respectively, to be movable only in said X-direction,
wherein said plurality of X-direction guide slots and said plurality of X-direction engaging projections are positioned in a straight line parallel to said X-direction.

8. The stage apparatus according to claim 1, wherein said Y-direction guide device comprises:
a plurality of Y-direction guide slots elongated in said Y-direction and formed on one of said X-direction movable member and said Y-direction movable member; and
a plurality of Y-direction engaging projections formed on the other of said X-direction movable member and said Y-direction movable member to be engaged in said Y-direction guide slot, respectively, to be movable only in said Y-direction,
wherein said plurality of Y-direction guide slots are positioned in a straight line parallel to said Y-direction.

9. The stage apparatus according to claim 1, further comprising:
an X-direction actuator which moves said Y-direction movable member in said X-direction relative to said stationary support member; and
an Y-direction actuator which moves said Y-direction movable member in said Y-direction.

10. The stage apparatus according to claim 1, further comprising:
an X-direction actuator which moves said X-direction movable member in said X-direction relative to said stationary support member; and
an Y-direction actuator which moves said Y-direction movable member in said Y-direction relative to said X-direction movable member.

11. The stage apparatus according to claim 10, wherein said stage apparatus is incorporated in a camera,
wherein said camera comprises:
an image pick-up device which is located on an image plane of a photographing optical system of said camera;
a camera shake detection sensor which detects camera shake of said camera; and
a controller for driving said X-direction actuator and said Y-direction actuator in accordance with said camera shake detected by said camera shake detection sensor to stabilize an object image which is formed on said image pick-up device through said photographing optical system.

12. The stage apparatus according to claim 10, wherein said stage apparatus is incorporated in a camera,
wherein said camera comprises:
a correction lens fixed to said movable stage in front of an image plane of a photographing optical system of said camera and provided on an optical axis of said photographing optical system;
a camera shake detection sensor which detects camera shake of said camera; and
a controller for driving said X-direction actuator and said Y-direction actuator in accordance with said camera shake detected by said camera shake detection sensor to stabilize an object image which is formed on said image pick-up device through said photographing optical system and said correction lens.

13. The stage apparatus according to claim 11, wherein said stationary support plate lies in a plane orthogonal to an optical axis of said photographing optical system.

14. The stage apparatus according to claim 12, wherein said stationary support plate lies in a plane orthogonal to said optical axis of said photographing optical system.

15. The stage apparatus according to claim 1, wherein said imaginary triangle is an isosceles triangle.

16. The stage apparatus according to claim 1, wherein said three balls are made of metal.

17. The stage apparatus according to claim 6, wherein said retaining device comprises a plurality of spring members for biasing said Y-direction movable member toward said X-direction movable member.

18. The stage apparatus according to claim 1, wherein said three ball retaining through-holes are positioned around a rectangular aperture formed in said X-direction movable member.

19. The stage apparatus according to claim 18, wherein one of said three ball retaining through-holes is positioned on an opposite side of said rectangular aperture with respect to remaining two of said three ball retaining through-holes.

20. The stage apparatus according to claim 1, wherein said X-direction movable member comprises three ball holders made of resilient synthetic resin which are fitted into three mounting holes formed in said X-direction movable member to be fixed thereto, said three ball retaining through-holes being formed in said three ball holders, respectively.

* * * * *